United States Patent [19]

Arnold, Jr.

[11] 4,035,697
[45] July 12, 1977

[54] MOTOR DRIVEN MAGNETICALLY COUPLED VARIABLE CAPACITOR

[75] Inventor: Frank Arnold, Jr., Locust Valley, N.Y.

[73] Assignee: Photocircuits Division of Kollmorgen Corporation, Hartford, Conn.

[21] Appl. No.: 615,994

[22] Filed: Sept. 23, 1975

[51] Int. Cl.² ........................................ H01G 5/14
[52] U.S. Cl. .............................. 361/289; 361/287
[58] Field of Search ................. 317/245, 250, 251; 310/104, 103, 268

[56] References Cited

U.S. PATENT DOCUMENTS

| | | | |
|---|---|---|---|
| 1,725,639 | 8/1929 | Herman | 317/251 |
| 2,527,237 | 10/1950 | Wilcox | 310/103 |
| 2,556,846 | 6/1951 | Longacre | 317/245 |
| 2,883,593 | 4/1959 | Jennings | 317/251 X |
| 3,051,858 | 8/1962 | McCown | 310/104 |
| 3,375,386 | 3/1968 | Haynor | 310/268 |
| 3,936,683 | 8/1974 | Walker | 310/104 |

Primary Examiner—E. A. Goldberg

[57] ABSTRACT

A motor driven magnetically coupled variable capacitor including a follower magnet arranged internally of the capacitor and fixedly coupled to a rotatable shaft, a follower magnet drive magnetically coupled to the follower magnet for rotating the follower magnet and therefore the rotatalbe shaft, a plurality of stationary capacitive elements fixedly mounted at one end of the capacitor, and a plurality of movable capacitive elements mechanically coupled to the rotatable shaft for axial movement therealong in response to rotation of the rotatable shaft by the follower magnet. The movable capacitive elements coacting with the stationary capacitive elements to vary the capacitance of the capacitor in response to activation of the follower magnet drive.

18 Claims, 4 Drawing Figures

MOTOR DRIVEN MAGNETICALLY COUPLED VARIABLE CAPACITOR

The present invention relates to capacitors, and more particularly to variable capacitors.

Generally, existing variable capacitors used in high voltage circuits employ a lead screw to drive a bellows axially along the centerline of the capacitor. A movable set of concentric copper rings are attached to one end of the bellows. As the bellows is moved axially the attached concentric copper rings next within a complimentary set of stationary copper rings positioned at one end of the capacitor. The capicitance is directly related to the degree of nesting between the two sets of copper rings. The bellows is used to vacuum seal the sets of copper rings which are maintained at near zero vacuum pressure. However, the atmospheric pressure external to the bellows tends to axially expand the bellows to its full length. As a result, the lead screw is subjected to a high thrust load which causes high frictional losses when driving the capacitor, thereby requiring large driving torques from remotely located motors. Moreover, the continuous expansion and contraction (flexure) of the bellows causes fatigue cracks in the bellows which dissipate the vacuum resulting in capacitor failure.

It is an object of the present invention to provide a variable capacitor which overcomes the aforementioned disadvantages of prior art variable capacitors.

It is a further object of the present invention to provide a variable capacitor which eliminates the need to employ a bellows.

It is a still further object of the present invention to provide a variable capacitor in which the rotating element is not subjected to a thrust load.

It is a still further object of the present invention to provide a variable capacitor in which the entire interior of the capacitor is under vacuum.

It is a still further object of the present invention to provide a variable capacitor having a drive motor integrally coupled thereto.

Other objects, aspects, and advantages of the present invention will be apparent from the specification amd drawings.

Briefly, a variable capacitor is provided in accordance with the present invention including a follower magnet arranged internally of the capacitor and fixedly coupled to a rotatable shaft, follower magnet drive means magnetically coupled to the follower magnet for rotating the follower magnet and therefore the rotatable shaft, a plurality of stationary capacitive elements fixedly mounted at one end of the capacitor, and a plurality of movable capacitive elements mechanically coupled to the rotatable shaft for axial movement therealong in response to rotation of the rotatable shaft by the follower magnet, the movable capacitive elements coacting with the stationary capacitive elements to vary the capacitance of the capacitor in response to activation of the follower magnet drive means.

The preferred embodiments of the present invention are illustrated in the drawings. However, it should be expressly understood that the present invention should not be construed as being limited solely to the preferred embodiments. The drawings are as follows.

Figure 1:
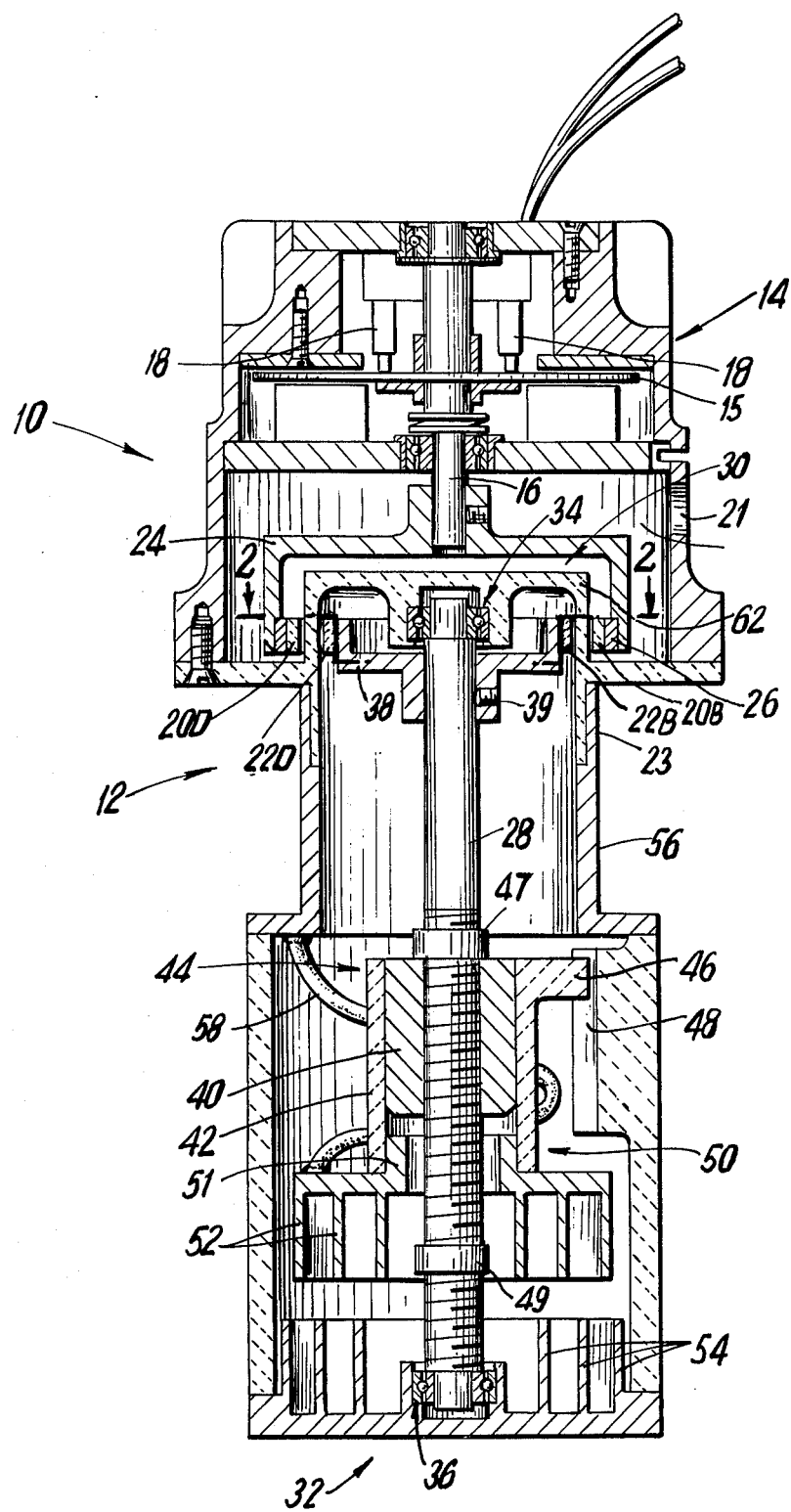
FIG. 1 is a cross-sectional view of one embodiment of a motor driven magnetically coupled variable capacitor in accordance with the present invention.

Referring to FIG. 1, a variable capacitor in accordance with the present invention is generally illustrated at 10. The variable capacitor 10 includes an evacuated capacitor portion 12 and a drive motor 14 at atmospheric pressure which is mechanically coupled to the evacuated capacitor portion 12. Preferably, the drive motor 14 is a variable speed D.C. moving coil motor having a non-iron armature to eliminated any preferred position cogging and provide rapid or fine tuning. However, A.C. drive motors may also be used, as desired. Advantageously, the drive motor 14 is of the printed circuit type to conserve space and includes a disc-shaped armature 15 coupled to the motor shaft 16 for rotating the motor shaft 16 in response to energization of brushes 18 of the drive motor 14.

Four drive magnets 20A-D are mechanically coupled to the motor shaft 16 and positioned within the housing 21 of the drive motor 14. Corresponding follower magnets 22A-D are arranged in spaced relationship to the drive magnets 20A-D and positioned within the housing 23 of the evacuated capacitor portion 12.

Figure 2:
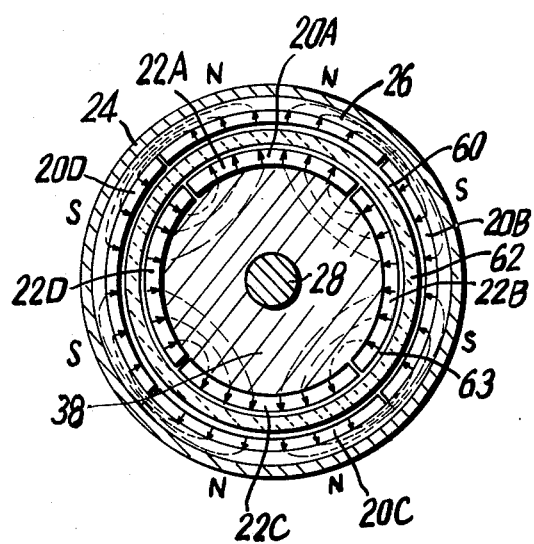
FIG. 2 is a sectional view taken along lines 2—2 of FIG. 1.

Advantageously, the drive magnets 20A-D are arcuate in shape forming a ring having alternately polarized portions (N-S) every 90°, see FIG. 2. The drive magnets 20 are mechanically affixed to a support collar 24 which is fixedly coupled to the motor shaft 16, e.g., with a screw. Preferably, the drive magnets 20 are affixed to a magnetic flux return ring 26 which is then affixed to the support collar 24. Advantageously, the drive magnets 20 and magnetic flux return ring 26 are bonded to each other and then to the support collar 24 with a suitable adhesive, e.g., Grade 306 adhesive commercially available from Loctite Corp.

Advantageously, the follower magnets 22A-D are arcuate in shape forming a ring having alternately polarized portions (N-S) every 90°, see FIG. 2. The follower magnets 22A-D are mechanically affixed to a rotatable shaft or lead screw 28 which is rotatably mounted in housing 12 at its ends 30 and 32 by ball bearings and races 34 and 36, respectively. Advantageously, glass balls and polytetrafluoroethylene (Teflon) races are employed. Preferably, the follower magnets 22A-D are affixed to the lead screw 28 through a magnetic flux return hub 38. Advantageously, the follower magnets 22A-D and magnetic flux return hub 38 are bonded to each other and by a suitable adhesive, e.g., Grade 161 adhesive commercially available from Amicon, Inc. The magnetic flux return hub 38 may be affixed to the lead screw 28 with screw 39.

Preferably, the drive magnets 20A-D and the follower magnets 22A-D are constructed of a material having large intrinsic coercive properties, such as barium or strontium ceramics or the rare earths, to enable the use of relatively large air gaps while maintaining strong magnetic coupling therebetween, without being susceptible to demagnetization.

Positioned intermediate the ends 30 and 32 of the lead screw 28 is a drive nut 40 affixed to an insulating anti-rotation collar 42. One end 44 of the anti-rotation collar 42 includes a tab 46 for engaging a stop member 48 integrally coupled to the housing 23 to prevent rotation of the drive nut 40 and translate the rotational movement of the lead screw 28 into linear movement of the drive nut 40. Therefore, with the tab 46 engaging stop member 48, the drive nut 40 is forced to move axially along the lead screw 28 as the lead screw 28 rotates. A pair of stop nuts 47 and 49 are mounted on the lead screw 28 and spaced on opposite sides of the drive nut 40 along the lead screw 28. The position of the stop nuts 47 and 49 may be adjusted along the length of the lead screw 28 to set the limits of the upward and downward movement of the drive nut 40.

Affixed to the other end 50 of the insulating antirotation collar 42, remote from the tab 46, is a flange 51, e.g., of copper. The flange 51 includes a plurality of concentric copper rings 52 depending therefrom. A mating plurality of stationary copper rings 54 are concentrically arranged about the lead screw 28 at end 32 and are integrally formed with housing 23 of the capacitor portion 12.

Preferably, the end 32 of the capacitor portion 12 is formed of a good conductor, e.g., copper, and the stationary copper rings 54 are integrally formed therewith, to provide a negative polarity power contact for the variable capacitor 10. Likewise, an intermediate portion 56 of the housing 23 is formed of a good conductor, e.g., copper, to provide a positive polarity contact for the variable capacitor 10. Preferably, the remainder of the housing 23 of the capacitor portion 12 is formed of a ceramic insulator. An electrical connection is effected between the positive polarity contact 56 and the flange 51 by a flexible lead 58. Advantageously, the flexible lead 58 is soldered or welded to the positive polarity contact 56 and the flange 51. Thus, a variable capacitive coupling is provided between the positive and negative polarity contacts 56 and 32 depending on the position or degree of nesting of the movable concentric copper rings 52 relative to the stationary concentric copper rings 54.

Referring specifically to FIG. 2, a section is shown through the drive magnets 20A-D and the follower magnets 22A-D. The magnetic flux return ring 26 which is advantageously made of soft steel and concentrically arranged about the drive magnets 20A-D provides magnetic flux return paths between the drive magnets 20A-D. Drive magnets 20A and C are North poles and drive magnets 20B and D are South poles so that the magnetic flux return paths are from drive magnet 20A to drive magnets 20B and 20D, and from drive magnet 20C to drive magnets 20B and 20D.

Adjacent the inner surface of drive magnets 20A-D is a clearance air gap 60. Adjacent the clearance air gap 60 is an insulator 62, advantageously formed of ceramic or glass, which is non-permeable to the magnetic lines of flux of drive magnets 20A-D and follower magnets 22A-D. As shown in FIG. 1, the insulator 62 is advantageously cupshaped to provide a non-permeable air gap between the drive magnets 20A-D and the follower magnets 22A-D, insulate the lead screw 28 from the positive polarity contact 56, and provide a seat for the ball bearing and race 34.

Adjacent the insulator 62 is another clearance air gap 63 concentric with the follower magnets 22A-D, magnetic flux return hub 38, and lead screw 28. Advantageously, the magnetic flux return hub 38, may be formed from soft iron to provide magnetic flux return paths between the follower magnets 22A-D. Follower magnets 22A-D correspond in polarity to drive magnets 20A-D, respectively. Thus, as drive magnets 20A-D are rotated by drive motor 14, the corresponding follower magnets 22A-D being magnetically coupled to drive magnets 20A-D tend to rotate so that corresponding poles of the magnets 20A-D and 22A-D remain aligned. Rotation of the follower magnets 22A-D causes rotation of the rotatable shaft 28 affixed thereto thereby increasing or decreasing the amount of nesting of the sets of concentric copper rings 52 and 54 and thus varying the capacitance of the variable capacitor 10. Advantageously, the magnetic coupling between the drive magnets 20A-D and follower magnets 22A-D acts as a slip clutch during stall conditions to prevent accidental motor stoppage.

Figure 3:
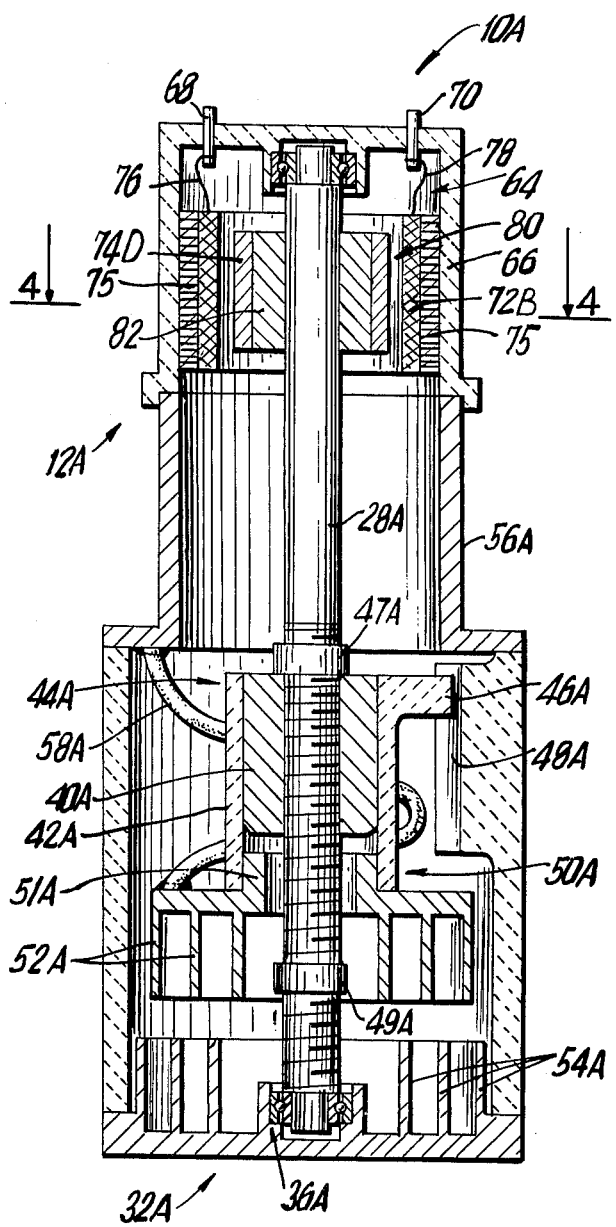
FIG. 3 is a partial cross-sectional view of another embodiment of a magnetically coupled variable capacitor in accordance with the present invention.
Figure 4:
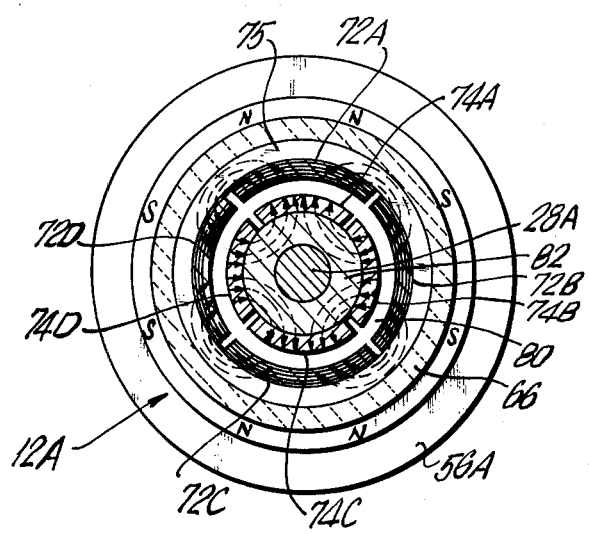
FIG. 4 is a sectional view taken along lines 4—4 of FIG. 3.

Referring to FIG. 3 and FIG. 4, another embodiment for the variable capacitor is indicated at 10A. Those components shown in this embodiment which are identical in structure and function to the corresponding components shown in FIG. 1 have been given numerals identical with those of FIG. 1 followed by the suffix "A". To avoid repetition, these identical components will not be specifically discussed. In this embodiment a brushless D.C. motor 64 is arranged within the vacuum environment of the variable capacitor 10A. The D.C. brushless motor 64 is housed within a ceramic insulating cup 66 affixed to the intermediate portion 56A. The sidewalls of the cup 66 are generally of the same diameter as the intermediate portion 5A. A pair of wire feed thru terminals 68 and 70 are embedded in insulating cup 66 and cylindrical stator coils or windings 72A-D are affixed to the inner surface of the ceramic insulating cup 66. Preferably, the cylindrical coils 72 include sensors (not shown) positioned therein for sensing the position of follower magnets 74A-D. Advantageously, the sensors are magnetic sensors such as Hall devices. However, it should be understood that non-magnetic sensors, such as LED's and phototransistors may also be used.

Preferably, the cylindrical stator coils or windings 72A-D are affixed to a laminated magnetic return cylinder 75 which is bonded to the inner surface of the insulating cup 66. Wire leads 76 and 78 electrically couple the terminals 68 and 70 to the cylindrical coils 72A-D for supplying current thereto.

The follower magnets 74A-D are advantageously formed as a cylinder which is concentrically arranged relative to the cylindrical coils 72A-D and spaced from the inner surface of the cylindrical coils 72A-D providing a clearance air gap 80 therebetween. The follower magnets 74A-D are preferably fixedly coupled to the lead screw 28A by a magnetic return collar 82, which may be of soft iron.

In operation of the variable capacitor 10A, the position of follower magnets 74A-D is sensed by the sensors, preferably magnetic, to switch the current to selectively energize the stator coils 72A-D, thereby causing rotation of the follower magnets 74A-D as the flux paths in the stator coils 72A-D and follower magnets 74A-D tend to align. Rotation of the follower magnets 74A-D causes rotation of the lead screw 28A affixed thereto thereby varying the amount of nesting between the two sets of concentric copper rings 52 and 54 and thus the capacitance of the variable capacitor 10A. Although the brushless D.C. motor 64 is shown with a radial air gap 80 it should be understood that a brushless D.C. motor having an axial air gap could also be used.

Advantageously, the embodiment shown in FIG. 3 and FIG. 4 provides a smaller overall variable capacitor, whereas the embodiment shown in FIGS. 1 and 2 enables easy replacement of the drive motor 14 in the event of failure.

It should be understood by those skilled in the art that various modifications may be made in the present invention without departing from the spirit and scope thereof, as described in the specification and defined in the appended claims.

What is claimed is:
1. A motor driven variable capacitor, comprising:
a capacitor housing;
follower magnet means arranged within said capacitor housing and fixedly coupled to a rotatable shaft;
follower magnet drive means magnetically coupled to said follower magnet means for rotating the same;
a plurality of stationary capacitive elements fixedly coupled to said capacitor housing;
a plurality of movable capacitive elements mechanically coupled to said rotatable shaft for axial movement therealong in response to rotation of said rotatable shaft by said follower magnet, said movable capacitive elements coacting with said stationary capacitive elements to vary the capacitance of the variable capacitor in response to activation of said follower magnet drive means; and
insulating anti-rotation means for coupling said movable capacitive elements to said rotatable shaft for translating rotational movement of said rotatable shaft into linear movement of said movable capacitive elements, said insulating anti-rotation means includes threaded drive nut mounted on said rotatable shaft, said rotatable shaft being threaded to receive said threaded drive nut, an insulating collar concentrically affixed to said threaded drive nut and fixedly coupled to said movable capacitive elements, said insulating collar having a tab coupled thereto, and stop means fixedly coupled to said capacitor housing for engagement by said tab to prevent rotation of said threaded drive nut and translate the rotational movement of said rotatable shaft into linear movement of said threaded drive nut and thus said movable capacitive elements.

2. The motor driven variable capacitor recited in claim 1, including:
stop means for limiting the axial movement of said movable capacitive elements along said rotatable shaft.

3. The motor driven variable capacitor recited in claim 1, wherein:
said follower magnet means includes a plurality of magnets having opposite polarities alternately arranged to form a ring.

4. The motor drive variable capacitor recited in claim 1 wherein:
said follower magnet means has large intrinsic coercive properties.

5. The motor driven variable capacitor recited in claim 3, wherein:
said follower magnet drive means includes a drive magnet means having a plurality of magnets of opposite polarities alternately arranged to form a ring concentric with said magnetic follower ring.

6. The motor driven variable capacitor recited in claim 1, wherein:
said follower magnet drive means is positioned externally of said capacitor housing and mechanically coupled thereto.

7. The motor driven variable capacitor recited in claim 1, wherein:
said follower magnet drive means is positioned internally of said capacitor housing.

8. The motor driven variable capacitor recited in claim 1, wherein:
said follower magnet drive means includes a drive shaft, rotatable drive magnet means and magnetic flux return means coupling said rotatable drive magnet means to said drive shaft for providing magnetic flux return paths for the magnetic flux from said rotatable drive magnet means.

9. The motor driven variable capacitor recited in claim 8, including:
magnetic flux return means coupling said follower magnet means to said rotatable shaft for providing magnetic flux return paths for the magnetic flux from said follower magnet means.

10. A motor driven variable capacitor recited in claim 9, including:
non-permeable means for providing a non-permeable air gap between said follower magnet means and said rotatable drive magnet means.

11. The motor driven variable capacitor recited in claim 9, wherein:
said rotatable drive magnet means and said follower magnet means have large intrinsic coercive properties to enable the use of relatively large air gaps therebetween.

12. The motor driven variable capacitor recited in claim 1, wherein:
said follower magnet drive means includes rotatable drive magnet means which is magnetically coupled to said follower magnet means for inducing rotation thereof in response to rotation of said rotatable drive magnet means.

13. The motor driven variable capacitor recited in claim 1, wherein:
said follower magnet drive means includes a D.C. moving coil armature.

14. The motor driven variable capacitor recited in claim 1, wherein:
said follower magnet drive means includes a stator coil means capable of being selectively energized.

15. The motor driven variable capacitor recited in claim 14, wherein:
said follower magnet drive means includes laminated magnetic flux return means fixedly coupled to said stator coil means for providing magnetic flux return paths for said follower magnet drive means.

16. The motor driven variable capacitor recited in claim 1, wherein:
said follower magnet drive means is maintained at atmospheric pressure;
said capacitor housing is evacuated and maintained at near zero pressure.

17. A motor driven variable capacitor, comprising:
follower magnet means arranged within the evacuated housing of the capacitor and fixedly coupled to a rotatable shaft, said follower magnet means having large intrinsic coercive properties;
a magnetic flux return member for providing flux return paths for the flux from the follower magnet means;
follower magnet drive means including a rotatable drive magnet having large intrinsic coercive properties maintained at atmospheric pressure and magnetically coupled to said follower magnet means for rotating the same;

a plurality of stationary concentric capacitive rings within the capacitor mounted on one end of the capacitor housing;

a plurality of movable concentric capacitive rings mechanically coupled to said rotatable shaft for linear movement therealong in response to rotation of said rotatable shaft by said follower magnet drive means, said movable concentric rings coacting with said stationary concentric capacitive rings to vary the capacitance of the variable capacitor in response to activation of said follower magnet drive means; and insulating anti-rotation means for coupling said movable capacitive elements to said rotatable shaft for translating rotational movement of said rotatable shaft into linear movement of said movable capacitive elements, said insulating anti-rotation means includes a threaded drive nut mounted on said rotatable shaft, said rotatable shaft being threaded to receive said threaded drive nut, an insulating collar concentrically affixed to said threaded drive nut and fixedly coupled to said movable capacitive elements, said insulating collar having a tab coupled thereto, and stop means fixedly coupled to said capacitor housing for engagement by said tab to prevent rotation of said threaded drive nut and translate the rotational movement of said rotatable shaft into linear movement of said threaded drive nut and thus said movable capacitive elements.

18. A motor driven variable capacitor, comprising:

follower magnet means arranged within the evacuated housing of the capacitor and fixedly coupled to a rotatable shaft, said follower magnet means having large intrinsic coercive properties;

a magnetic flux return means for providing flux return paths for the flux from the follower magnet means;

follower magnet drive means arranged within the evacuated housing of the capacitor and including stator coil means adapted to be selectively energized for magnetically coupling to said follower magnet means for rotation thereof;

a plurality of stationary concentric capacitive rings within the capacitor mounted on one end of the capacitor housing;

a plurality of movable concentric capacitive rings mechanically coupled to said rotatable shaft for linear movement therealong in response to rotation of said rotatable shaft by said follower magnet drive means, said movable concentric capacitive rings coacting with said stationary concentric capacitive rings to vary the capacitance of the variable capacitor in response to activation of said follower magnet drive means; and insulating anti-rotation means for coupling said movable capacitive elements to said rotatable shaft for translating rotational movement of said rotatable shaft into linear movements of said movable capacitive elements, said insulating anti-rotation means includes a threaded drive nut mounted on said rotatable shaft, said rotatable shaft being threaded to receive said threaded drive nut, an insulating collar concentrically affixed to said threaded drive nut and fixedly coupled to said movable capacitive elements, said insulating collar having a tab coupled thereto, and stop means fixedly coupled to said capacitor housing for engagement by said tab to prevent rotation of said threaded drive nut and translate the rotational movement of said rotatable shaft into linear movement of said threaded drive nut and thus said movable capacitive elements.

* * * * *